United States Patent Office 3,158,651
Patented Nov. 24, 1964

3,158,651
BIS(C-ALKYLHYDROZINO) DECABORANES
AND METHOD OF MAKING SAME
John E. Paustian, Whippany, Stanley Mutnick, Old
Bridge, and Marvin M. Fein, Westfield, N.J., assignors
to Thiokol Chemical Corporation, Bristol, Pa., a corporation of Delaware
No Drawing. Filed Nov. 23, 1960, Ser. No. 71,358
11 Claims. (Cl. 260—564)

This invention relates to compounds containing boron and to methods of making the same, and relates in particular to bis(C-alkylhydrazidino)-decaboranes and alkyldecaboranes and methods of making the same.

It is known in the art that solid propellant compositions suitable for rocket power plants and other jet-propelled devices can be formulated from combustible organic fuels intimately admixed with oxidizing agents. As fuel materials, for example, curable polymers of rubber, of polyurethane resins, or polyester and polyether materials have heretofore been employed in the art. As oxidizers, ammonium, potassium, or sodium perchlorate, ammonium nitrate, etc., have shown particular suitability.

Propellant mixtures of such fuels and oxidizers are compounded by a number of techniques known to the art. For example, the mixtures may comprise from 5 to 35 parts by weight of fuel, conveniently in the form of a cured polymer, and from 65 to 95 parts by weight of a solid oxidizing agent intimately mixed therewith. A number of such solid propellant compositions, and details of their manufacture and processing, are disclosed, for example, in the book "Rocket Propellants" by Francis A. Warren, Reinhold Publishing Corporation, New York, 1958. The art has continually searched for more and more energetic compounds for use as rocket fuels in order to increase the efficiency of rocket engines by maximizing thrust per unit of weight or volume. Combustible boron compounds, in particular, because of their exceptionally high heats of combustion, are useful components of such solid fuel mixtures.

The present invention concerns organic compounds containing boron, which compounds are particularly useful as additives to propellant compositions to increase their energy. Depending on the specific system, quantities of the novel compounds described herein are added to propellant compositions in such amounts as do not interfere with the curing or casting of the specific polymeric material being used as the fuel.

The materials of the invention are bis(C-alkylhydrazidino) boranes produced by the reaction of hydrazine with a bis(nitrilo) borane. Specifically, hydrazine is reacted with bis(nitrilo) decaborane or a bis(nitrilo) alkyl decaborane prepared by the method described in copending application Ser. No. 690,407, filed October 15, 1957 by Murray S. Cohen et al. Suitable bis(nitrilo) decaboranes disclosed in that application include those prepared by reacting one molar part of decaborane with from 0.01 to 14 moles of a nitrile of an unsubstituted aliphatic monocarboxylic acid or dicarboxylic acid having from 1 to 6 carbon atoms at a temperature of 0° to 180° C.

Bis(nitrilo) alkyl decaboranes can similarly be prepared by the methods described in copending application Ser. No. 751,804, filed July 29, 1958, now U.S. Patent No. 3,030,407, by Edmund L. Graminsky et al. and 772,631, filed November 7, 1958, by George J. Donovan et al.

Reaction of these boranes with hydrazine is accomplished by heating the materials alone or in an inert reaction medium. The temperatures of reaction are generally between about 25° C. and about 120° C., preferably between about 60° C. and 120° C. depending on the boiling point of the medium. It is particularly convenient to operate by heating at the reflux temperature of the mixture of reactant and reaction medium. The time of reaction varies, with greater yields being afforded by longer periods of reaction. In general, a reaction period between about 2 and about 24 hours is sufficient for substantial conversion to the desired product.

By "inert reaction medium" is meant a liquid medium not interfering with the course of the reaction by itself reacting with either of the reactant materials or the reaction product. The medium is not necessarily a solvent for either of the reactants. In general, hydrocarbon solvents such as benzene, toluene, and xylene, aliphatic hydrocarbon solvents such as N-pentane, hexane, and heptane, cycloaliphatic solvents such as cyclohexane and methyl cyclopentane, and oxygenated organic solvents such as dioxane and diisopropyl ether can be employed, to mention a few suitable organic materials. The reaction can also be carried out in water (suitable at a maximum temperature of about 90° C.), or merely in excess hydrazine, or in aqueous hydrazine mixtures.

The reaction proceeds by addition of hydrazine to the nitrilo group, one nitrogen atom of the hydrazine attaching itself to the carbon atom of the nitrilo group to give alkyl substituted hydrazidino compounds having the alkyl group attached to the carbon atom therein.

The course of the reaction can best be taught by reference to illustrative examples.

Example 1

Bis(acetonitrilo) decaborane was prepared by refluxing one mole of decaborane with 10 moles of acetonitrile for about 10 hours. Upon cooling, white crystals of bis(acetonitrilo) decaborane were filtered from the system.

30.0 grams (0.148 mole) of bis(acetonitrilo) decaborane as prepared above, 9.1 grams (0.284 mole) of hydrazine were reacted in 380 ml. of benzene for 16 hours at the reflux temperature of the mixture. A white crystalline solid (38.6 grams) was obtained from the reaction mixture by filtration. The solid was shown to be bis-(C-methyl-hydrazidino) decaborane by elemental and infra-red analysis.

Analysis for $C_4H_{26}N_6B_{10}$:

Theory: C=18.02; H=9.83; N=31.53; B=40.65
Found: C=17.64; H=9.83; N=32.97; B=38.75.

Absorption maxima in the infra-red spectrum confirmed the proposed C-methylhydrazidine structure:

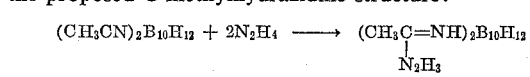

Although it is apparent from the reaction given above that the materials react in a molar proportion of 2:1, with hydrazine predominant, they can be reacted in a molar proportion between 1.5:1 and 2.5:1. The ratio of 2:1 is preferred as cutting down the formation of other undesirable reaction products formed in side reactions.

Example 2

30.3 grams (0.15 mole) of 96 percent pure bis(acetonitrilo) decaborane were added over a four minute period to 200 cc. of 40 percent aqueous hydrazine (2.5 mole), during which the temperature of the reaction mixture rose from 25° C. to 60° C.

The mixture was next heated at 80°–90° C. for about 4 hours. After cooling 31.4 grams (78 percent of theory) of product were obtained, which corresponded in its infra-red spectrum with the material produced in Example 1.

Although specific embodiments have been shown and described, it is to be understood that they are illustrative

What is claimed is:

1. A member selected from the group consisting of bis(C-alkylhydrazino) decaborane and bis(C-alkylhydrazino alkyl decaborane.

2. A substance as defined in claim 1 wherein said C-alkylhydrazino group contains 1–6 carbon atoms.

3. A bis(C-alkylhydrazino) decaborane.

4. A bis(C-alkylhydrazino) decaborane in which said C-alkylhydrazino group contains 1–6 carbon atoms.

5. Bis(C-methylhydrazino) decaborane.

6. The method of making, respectively, a member selected from the group consisting of bis(C-alkylhydrazino)-decaborane and bis(C-alkylhydrazino)-alkyldecaborane which comprises reacting hydrazine at a temperature between about 25° C. and about 120° C. with, respectively, a member selected from the group consisting of bis(alkylnitrilo) decaborane and bis(alkylnitrilo) alkyldecaborane.

7. The method as in claim 6 wherein hydrazine and bis(alkylnitrilo)-decaborane are reacted to make bis(C-alkylhydrazino)-decaborane.

8. The method as in claim 6 wherein the reaction takes place in an inert reaction medium.

9. The method as in claim 6 wherein the reactants are heated by refluxing in said inert reaction medium.

10. The method as in claim 7 wherein said alkylnitrilo group contains 1–6 carbon atoms.

11. The method of making bis(C-methylhydrazino) decaborane which comprises reacting at a temperature between about 25° C. and about 120° C., hydrazine and bis(acetonitrilo) decaborane.

No references cited.

UNITED STATES PATENT OFFICE
CERTIFICATE OF CORRECTION

Patent No. 3,158,651                                November 24, 1964

John E. Paustian et al.

It is hereby certified that error appears in the above numbered patent requiring correction and that the said Letters Patent should read as corrected below.

In the heading to the printed specification, line 2, for "ALKYLHYDROZINO" read -- ALKYLHYDRAZIDINO --; column 2, line 13, for "N-pentane" read -- n-pentane --; column 3, lines 5, 5 and 6, 8, 9, 10, 11, 14 and 15, and 15, and column 4, line 5, for "alkylhydrazino", each occurrence, read -- alkylhydrazidino --; column 3, line 12, and column 4, line 12, for "methylhydrazino", each occurrence, read -- methylhydrazidino --.

Signed and sealed this 3rd day of August 1965.

(SEAL)
Attest:

ERNEST W. SWIDER                                    EDWARD J. BRENNER
Attesting Officer                                       Commissioner of Patents